Oct. 27, 1936.  R. N. CUNDALL  2,058,775
AUTOMATIC WEIGHING DEVICE
Filed Sept. 8, 1932   6 Sheets-Sheet 1

INVENTOR
ROBERT N. CUNDALL
BY
ATTORNEY

Oct. 27, 1936.  R. N. CUNDALL  2,058,775
AUTOMATIC WEIGHING DEVICE
Filed Sept. 8, 1932  6 Sheets-Sheet 2

INVENTOR
Robert N Cundall
BY
ATTORNEY

Oct. 27, 1936.   R. N. CUNDALL   2,058,775
AUTOMATIC WEIGHING DEVICE
Filed Sept. 8, 1932   6 Sheets-Sheet 3

Fig. 3.

INVENTOR
ROBERT N. CUNDALL
BY
ATTORNEY

Oct. 27, 1936. R. N. CUNDALL 2,058,775
AUTOMATIC WEIGHING DEVICE
Filed Sept. 8, 1932    6 Sheets-Sheet 5

INVENTOR
ROBERT N. CUNDALL
BY
ATTORNEY

Patented Oct. 27, 1936

2,058,775

UNITED STATES PATENT OFFICE 2,058,775

AUTOMATIC WEIGHING DEVICE

Robert N. Cundall, Lackawanna, N. Y., assignor to Consolidated Packaging Machinery Corporation, a corporation of New York Application September 8, 1932, Serial No. 632,111

22 Claims. (Cl. 249—15)

My invention relates to automatic weighing devices adapted to deliver predetermined amounts of material such as coffee, sugar or the like, at a high rate of speed and with an extremely fine degree of accuracy.

In devices of this character, high speed and high accuracy are obtained by very rapidly delivering the bulk or principal proportion of the predetermined amount of material, without attempting to weigh this portion, and then delivering the remaining portion in a relatively small and uniform stream known as a "dribble". With a dribble stream very uniform in cross section, very high accuracy can be obtained, due to the fact that the amount of material suspended in the air each time the weighing device is actuated can be depended upon to be almost exactly the same.

Thus such a device may comprise in part a reservoir or supply vessel having a relatively large main gate adapted to be opened for a sufficient time to permit the rapid discharge of, for example, 90% to 95% of the predetermined amount of material, and a relatively small subsidiary or "dribble" gate adapted to discharge the remaining portion, together with some sort of mechanical device adapted to close the dribble gate when the receptacle to which the material is delivered receives the predetermined amount.

The devices of the prior art have, however, been subject to inaccuracies which, although they may appear small to those unskilled in the art, are nevertheless of considerable importance. For example, prior machines have obtained an accuracy of about 0.03 ounce plus or minus when weighing one pound. This inaccuracy is principally due to friction, inertia and inevitable lost motion of the mechanical means employed to close the dribble gate, as well as to unevenness or lack of uniformity of the dribble stream, and it is therefore an object of my invention to provide more rapid and accurate means than have heretofore been employed, to cut off the flow of material passing through the dribble gate at the precise moment when the predetermined amount of material has passed the dribble gate.

In addition to the aforesaid object my invention has for further objects several other improvements and advantages in construction and operation, as will hereinafter be found to obtain.

My invention may most clearly be set forth and understood with reference to the accompanying drawings illustrating several modified forms of my invention. In these drawings.

Similar reference numerals designate similar parts in each of the several views of the drawings.

Referring now to the drawings, the apparatus of my invention comprises in part a supply vessel 1 supported by a bracket 2 upon a post 3. The supply vessel 1 receives material from an overhead hopper 4 through an opening 5.

Also mounted upon the column 3 is a bracket 6 carrying a shaft 7 having a sheave 8 connected by means of a belt 9 to a suitable motor. Shaft 7 also carries a second sheave 10 connected by means of a belt 12 to a sheave 13 carried by a shaft 14 mounted on brackets 15 located on top of the supply vessel 1. The shaft 14 is connected through bevel gears 16 to a vertical shaft 17 extending downward into the interior of the vessel 1 and having at its lower end a spiral or convolute screw 18 which is adapted upon rotation to cooperate with the downwardly converging sides of the vessel 1 to force material in a downward direction therein. The screw 18 is cut off a little above the level of the gates 24 and 26, and provided at this point with a plurality of depending agitating members 19 for a purpose which will be described hereinbelow.

Figure 6:
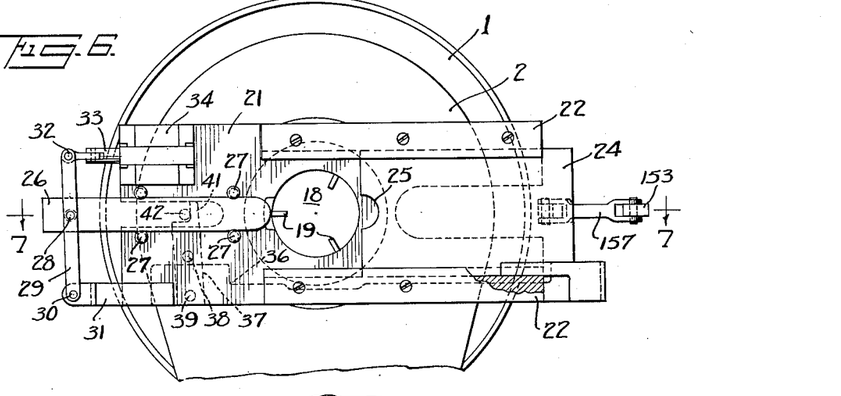
Fig. 6 is a horizontal view of a portion of the apparatus shown in Fig. 1, taken on the line 6—6 of Fig. 1.
Figure 7:
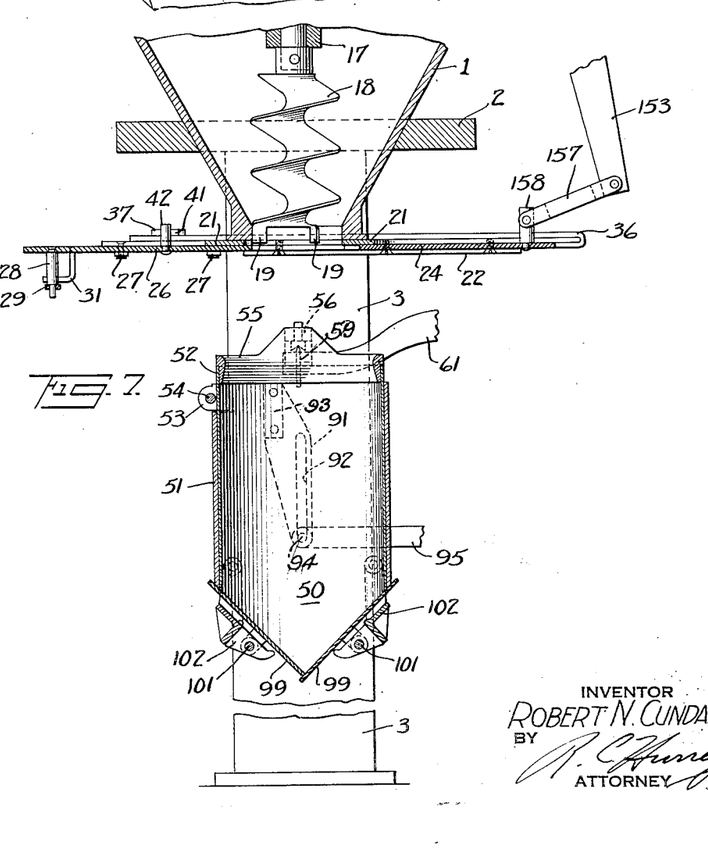
Fig. 7 is a vertical sectional view of a portion of the apparatus shown in Figs. 1 and 6, taken on the line 7—7 of Fig. 6.

Attached to the bottom of the vessel 1 is a plate 21 having sliding ways 22 adapted to guide a main gate 24 which is shown in Fig. 6 as in its full open position exposing substantially the entire cross sectional area of the bottom outlet of the vessel 1. The inner end of the main gate 24 is provided with a recessed portion 25 adapted to receive and coincide with the end of a subsidiary or dribble gate 26 mounted for reciprocal movement between rollers 27 attached to the plate 21. The outer end of the dribble gate 26 is attached by means of a pin 28 to a lever 29, one end of which is pivotally fastened at 30 to a bracket 31 fastened to the plate 21, and the other end of which is pivotally connected at 32 to a plunger 33 of a solenoid 34.

Opening of the main gate 24, in a manner which will subsequently be described, operates through an arm 36 and a lever 37, pivotally mounted at 38 and pivotally attached at 39 to the arm 36, to open the dribble gate 26; but closing the main gate 24 does not affect the position of the dribble gate 26. Thus it will be seen that an opening movement of the main gate 24 causes an extension 41 on the end of the lever 37 to bear against a pin 42 attached to the dribble gate 26, thereby opening the dribble gate 26, but a subsequent closing movement of the main gate 24 merely causes the extension 41 to move away from the pin 42, leaving the dribble gate 26 in an open position.

The continuously revolving screw 18 serves at all times to provide a sufficient feed for the gates 24 and 26 while the agitating members 19 insure that the material lying above the opening between the dribble gate 26 and the main gate 24 is in a constant and uniform state of agitation, thereby providing for a very uniform stream of material during such time as the main gate 24 is closed and the dribble gate 26 remains open.

Material passing from the supply vessel 1 through the gates 24 and 26, falls into a receptacle or bucket indicated generally by the reference numeral 50. Although the bucket 50 may be constructed of one piece or having a fixed capacity, I prefer to construct the bucket 50 in a telescopic manner to provide for varying the capacity of the same.

I accomplish this by providing an outer and lower casing 51 and an inner shell or liner 52 serving as an extension therefor and adapted to be positioned at any convenient height by means of a split collar 53 located near the top of the casing 51 and provided with a bolt 54 or other suitable fastening means.

The extension liner 52 is provided at its upper edge with a collar 55 carrying elevated and outwardly extending brackets 56 and 57 having inverted sockets 58 adapted to receive the upper, pointed ends of pivots 59 which are fastened to the ends 61 of a bifurcated balance beam 62. The beam 62 also carries pivots 63 resting in sockets 64 mounted upon a supporting angle 65, as well as a counterbalance weight 65'.

The opposite end 66 of the beam 62 has a threaded portion 67 carrying a vernier weight 68 which may be moved toward or away from an imaginary line joining the pivots 63 for fine adjustment of the beam. The threaded portion 67 terminates in a head 69 carrying a thin, vertically positioned vane 70. Upper and lower limit stops 71 and 72 are provided for limiting the travel of the beam 62.

Provision for locking the beam 62 against the lower limit stop 72 is made in an electromagnet 73, which acts upon an arm 74 fastened to the end 66 of the beam 62. The magnet 73 and stops 71 and 72 are mounted upon a platform 76 carried by the angle 65.

The purpose of the vane 70 is to intercept light from an incandescent bulb 80 or other suitable source of light to a photo-electric cell 81. The bulb 80 is fastened in a socket 82 mounted upon the platform 76 and is enclosed within a ventilated housing 83 having a narrow horizontal slot 84 therein. The photo-electric cell 81 is mounted upon a support 85 carried by the platform 76 and is enclosed within a housing 86 having a narrow horizontal slot 87 located immediately opposite to the slot 84 in the housing 83 of the incandescent bulb 80.

So long as the beam 62 remains against the lower limit stop 72, either through action of the electromagnet 73 or because the bucket 50 contains less than the predetermined amount of material to be delivered thereto, the upper end of the vane 70 occupies a position which is below the path of light passing from the bulb 80 through the slots 84 and 87 to the photo-electric cell 81. As soon as the predetermined amount of material is delivered to the bucket 50 the end 66 of the beam 62 rises and the vane 70 immediately cuts off the flow of light to the photo-electric cell 81, thereby actuating the solenoid 34 and closing the dribble gate 26.

Figure 1:
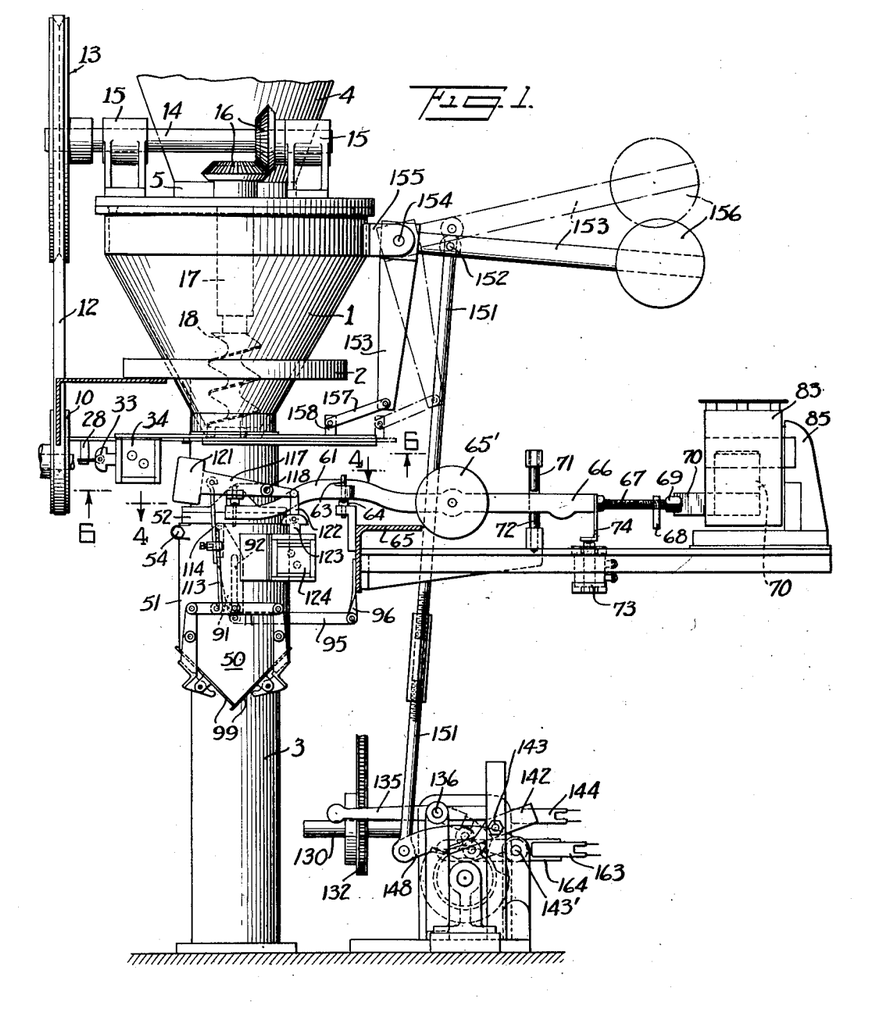
Fig. 1 is a side elevational view of an automatic weighing device constructed in accordance with my invention, parts being shown broken away.

Vertical alignment of the bucket 50 is insured by providing an alignment plate 91 having a vertical slot 92 and attached to a boss 93 on the side of the casing 51. The slot 92 is adapted to receive a pin 94 attached to an arm 95, the opposite end of which is fastened by means of a bracket 96 to the supporting angle 65. As shown in Fig. 1, with the liner 52 drawn into the casing 51 to reduce the capacity of the bucket 50 to a minimum, the plate 91 is fastened to the boss 93 in such manner as to depend downwardly from the latter. However, the plate 91 may be reversed so that the slot 91 extends upward from the boss 93 when the liner 52 is extended upwardly to enlarge the capacity of bucket 50 to a maximum. It will be obvious that this construction provides for free vertical movement of the bucket 50 but prevents any side-sway about the pivots 59.

It may be noted at this point that an advantage of the telescopic construction of bucket 50 is that it provides for reducing to a minimum the distance through which particles of material must fall from the gate 26 before coming to rest in the bucket 50, while at the same time providing for enlarging the capacity of the bucket 50 when so desired.

The lower end of the casing 51 is cut off along two planes converging downwardly at an angle of approximately 90°, and a closure for the bottom of the casing 51 or the bucket 50 is provided in a pair of preferably substantially semi-circular plates or doors 99. The doors 99 are pivotally attached at 101 to a corresponding pair of hinged members 102 pivotally attached by a pin 103 to bosses 104 appropriately located upon the sides of the casing 51. At one end of each of the hinges 102 there is provided an upwardly extending arm 105 pivotally attached by a pin 106 to links 107 and 108 which are in turn pivotally attached to each other by means of a pin 109. When the gates are in a closed position, the links 107 and 108 occupy substantially horizontal positions, a rest 111 being provided on the side of the casing 51 to limit downward movement of the links 107 and 108 past this position.

Figures 4, 5:
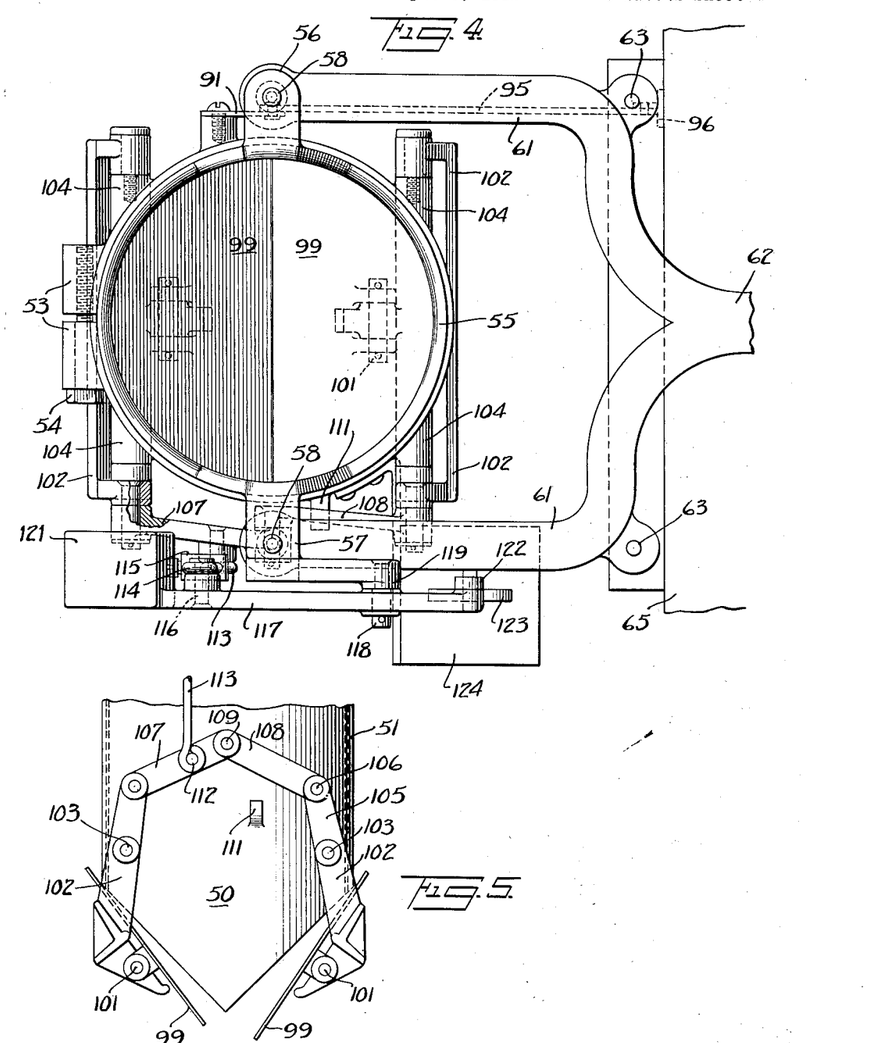
Fig. 4 is a horizontal sectional view of a portion of the apparatus shown in the preceding figures, being taken along the line 4—4 of Fig. 1.
Fig. 5 is an elevational view of a portion of the apparatus shown in Fig. 1, on an enlarged scale, illustrating the action of portions of the aforesaid apparatus.

The link 107 is provided with a pin 112 which is encircled by the end of a vertically extending rod 113. The rod 113 is in turn fastened to a similar rod 114 by means of a variable clamp fastener 115 (Fig. 4). The upper end of the rod 114 is looped to form an eye encircling a pin 116 (Fig. 4) mounted on an arm 117 pivotally mounted by means of a pin 118 to an arm 119 forming an extension of the bracket 57. The lever arm 117 carries at the end nearest the pin 116 a counterweight 121 while the opposite end of the arm 117 is pivotally attached to a link 122 which is in turn connected to the core member 123 of a solenoid 124. The solenoid 124 is adapted to be actuated to raise the counterweight 121 and open the gates 99 by means of a relay controlled by the photo-electric cell 81, as will be explained more fully hereinbelow.

In general, the cycle of operations to which my device is adapted consists of first emptying the previously filled bucket 50 by opening the gates 99 and re-closing the same, then opening the gates 24 and 26 to discharge the bulk of the predetermined amount of material into the bucket 50, and then closing the gate 24 while allowing the gate 26 to remain open until exactly the predetermined amount of material has passed through the gate 26, at which time the gate 26 closes. In order that this cycle of operations, with certain refinements subsequently to be described in detail, may be carried out very rapidly, I provide automatic time-sequence control and actuating mechanism, the nature and construction of which will now be described.

The shaft 7 drives a countershaft 130, which in turn drives a shaft 131 through suitable sprocket chain mechanism 132 and reducing mechanism 133. One end of the shaft 131 terminates in an automatic clutch mechanism 134 having a lever 135 pivotally attached to a shaft 136 and carrying an arm 137 biased downwardly by means of a spring or other suitable means (not shown). Normally one end of the arm 137 lies in the path of a cam 138 mounted upon a shaft 139, and the construction of the clutch mechanism 134 is such that depressing the handle 135 to such point as to move the arm 137 out of the path of the cam 138 causes the shaft 139 to perform one revolution. The clutch mechanism of this character is well-known and need not be described herein detail.

As the shaft 139 revolves, a cam 141 mounted thereon engages one end of a lever 142 pivotally mounted upon a shaft 143 and carrying at its other end a mercury switch 144 which controls the flow of electricity to the solenoid 124. The period of engagement of the cam 141 and the lever 142 is sufficient to close the circuit through the switch 144 for a sufficient period to permit the solenoid 124 to open the gates 99 and discharge the contents of the bucket 50, whereupon further travel of cam 141 permits the lever 142 and switch 155 to return to the dotted position as shown in Fig. 10, thereby causing the solenoid 124 to re-close the gates 99.

Figures 8, 9, 10, 11, 12, 13, 14:
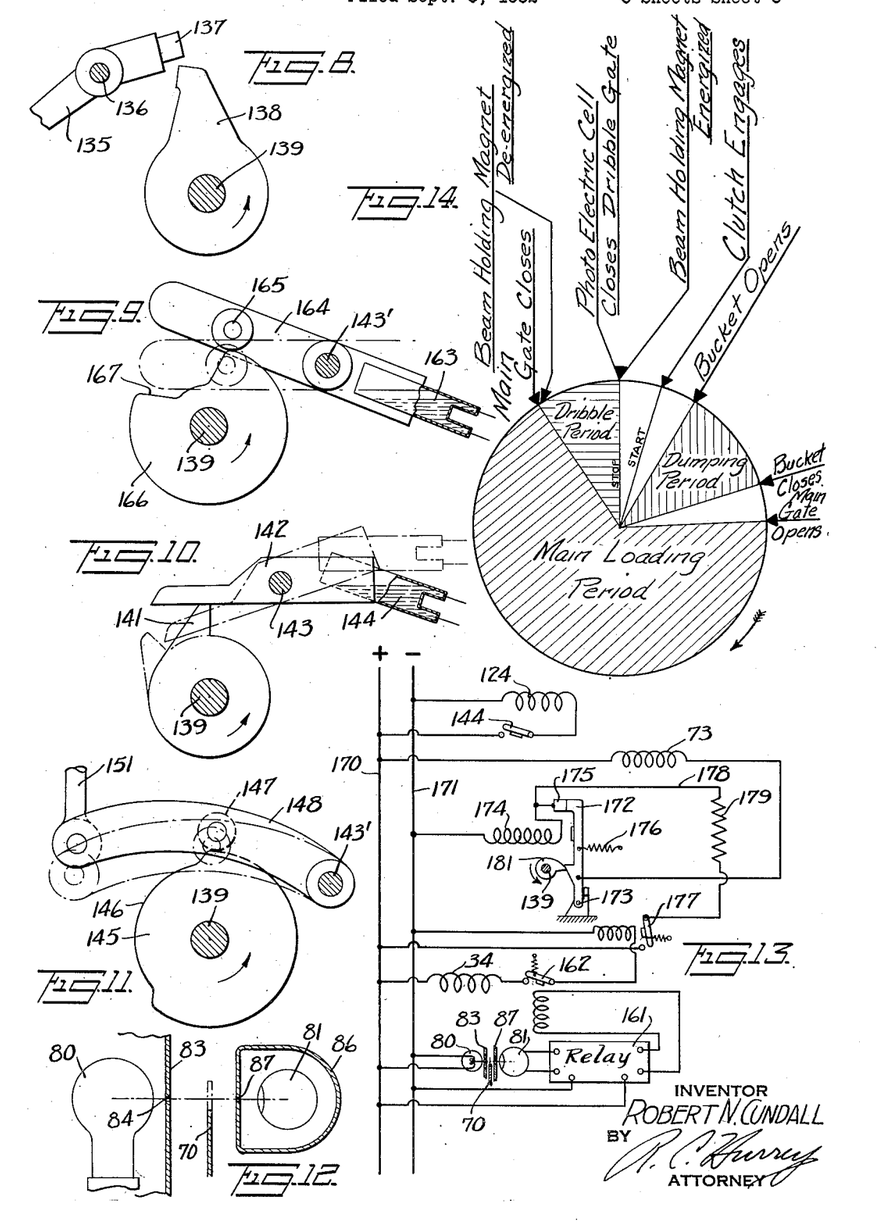
Figs. 8 to 11 are enlarged elevational views of several cam mechanisms forming a part of the apparatus shown in Figs. 1 and 2.
Fig. 12 is a more or less diagrammatic vertical sectional view of a portion of the apparatus shown in Fig. 1.
Fig. 13 is an electrical wiring diagram of a modified form of my invention.
Fig. 14 is a time-sequence diagram illustrating the sequence of operations taking place in one complete cycle of operation of the apparatus shown in Fig. 13.

Shortly after the gates 99 and the bucket 50 are thus closed, the bucket 50 now being empty, a cam 145, also mounted upon the shaft 139 and having a depressed portion 146, arrives at such point that it forces a cam roller 147 fastened to a lever 148, pivoted at one end about a shaft 143', to move upward into the full line position shown in Fig. 11. The opposite end of the lever 148 is pivotally attached to an adjustable push rod 151 which is in turn connected by means of a pin 152 to a bell crank 153 which is free to revolve about a pin 154 fastened in a bracket 155 attached to the upper portion of the vessel 1. The upper and outer end of the bell crank 153 carries a counterweight 156 while the inner and lower end of the bell crank 153 is attached by means of a link 157 to a pin 158 which is in turn fastened to the main gate 24.

When the cam 145 raises the cam roller 147 the push rod 151 also rises, causing the bell crank 153 to move into the dotted line position shown in Fig. 1, thereby moving the pin 158 to the right and opening the main gate 24. The cam 145 is so adjusted with respect to the speed of the shaft 139 that the roller 147 again lowers into the depressed portion of the cam 145 when the bulk, for example, 90 to 95 per cent of the predetermined amount of material, has had time to be discharged into the bucket 50. At this time the cam roller 147 lowers and the weight of the counterweight 156 acting through the bell crank 153 causes the pin 158 to move to the lefthand position as shown in Fig. 1, thereby closing the main gate 24. As mentioned hereinabove, this closing of the main gate 24 leaves the dribble gate 26 open.

The vernier weight 68 has previously been adjusted to take into account the amount of material falling through the air between the then open dribble gate 26 and the upper surface of the material lying in the bucket 50, and this being so, as soon as the predetermined amount of material has passed through the open dribble gate 26, the weight of the bucket 50 and its contents causes the beam 62 to tip. The instant this occurs the vane 70 intercepts the narrow stream of light passing from the bulb 80 to the photo-electric cell 81. This interruption of the supply of light to the photo-electric cell 81 operates through a relay 161 and a relay switch 162 to energize the solenoid 34, thereby closing the dribble gate 26 with extreme rapidity and shutting off the flow of material into the bucket 50. The shaft 139 then comes to rest, having completed one cycle of operations, which will be repeated as soon as the lever 135 is again depressed.

It will be obvious that the operator, during such time as the gates 99 are open to discharge the contents of the bucket 50, positions below the latter a suitable receptacle for the weighed material, which receptacle may be withdrawn as soon as the contents of the bucket 50 have been discharged.

It is highly desirable to provide against oscillation of the beam 62 during the main loading period, more especially during such time as the main gate 24 is open. However, the beam 62 must be freed in some manner as soon as the main gate closes and the "dribble period" commences. Means for thus temporarily locking the beam 62 is provided, as has been indicated hereinabove, in the electromagnet 73 which may be actuated in a number of ways.

Figure 2:
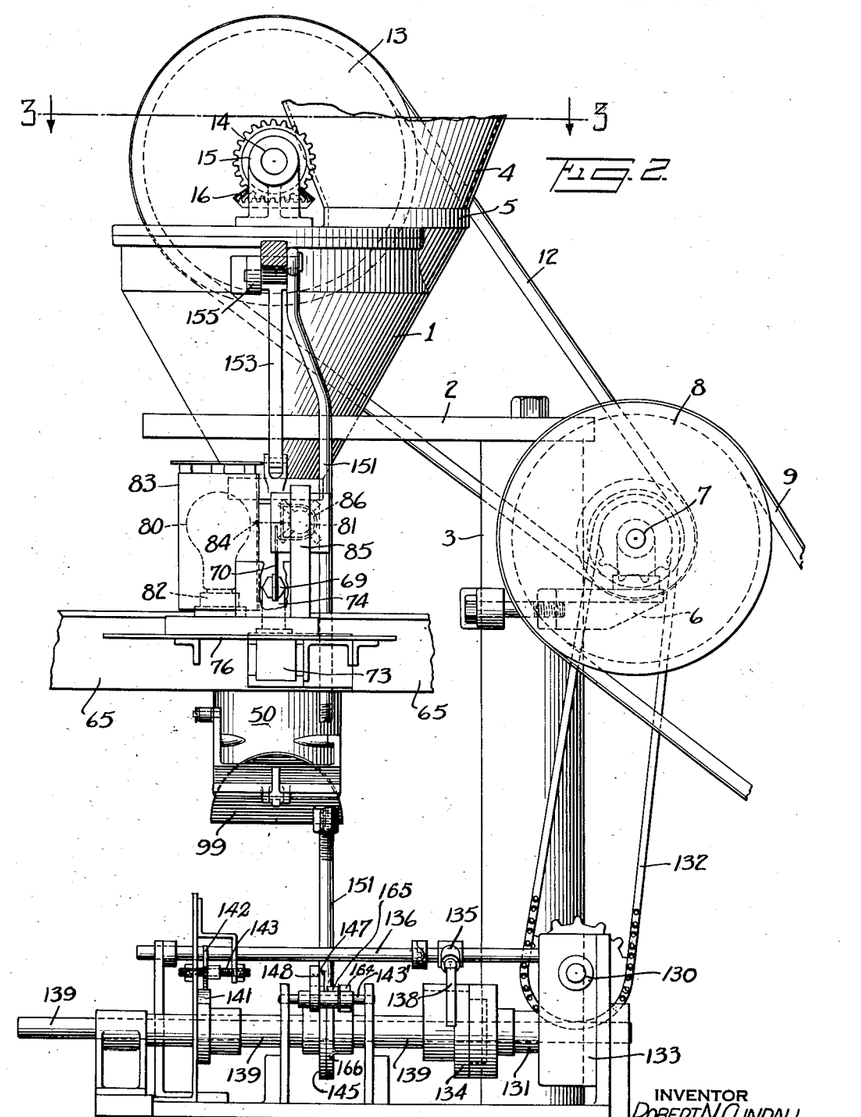
Fig. 2 is an end elevation view of the apparatus shown in Fig. 1.
Figure 3:
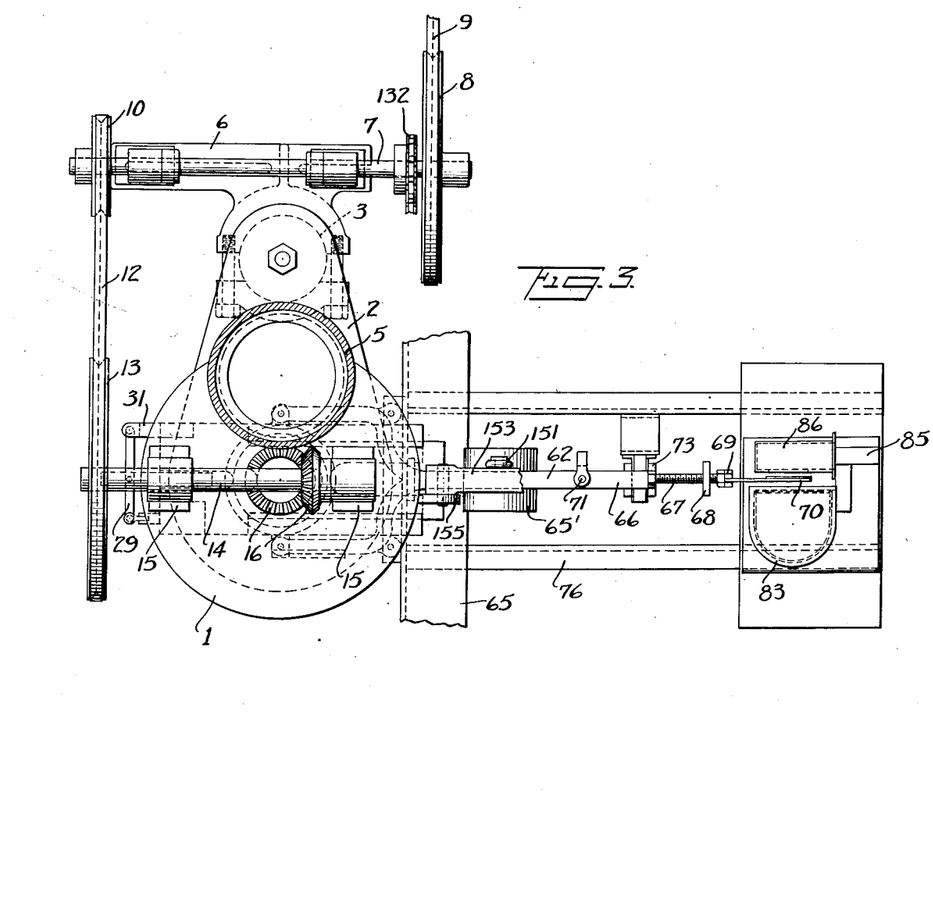
Fig. 3 is a horizontal sectional view of the apparatus shown in Figs. 1 and 2 taken along the line 3—3 of Fig. 2.

According to one form of my invention, which is illustrated in Figs. 1, 2 and 9, the flow of electricity to the electromagnet 73 is controlled by means of a mercury switch 163 mounted at one end of a lever 164 pivoted about the shaft 143' and having a cam roller 165 adapted to ride upon the surface of a cam 166 attached to the shaft 139 and having a depressed portion 167. In this instance, the outer configuration of the cam 166 and the depressed portion 167 thereof is such that the cam roller 165 is raised by the cam 166, thereby closing the switch 163, energizing the electromagnet 73 and locking the beam 62, just before the cam 145 raises the cam roller 147 to open the main gate 24. The cam roller 165 is not again engaged by the depressed portion 167 of the cam 166, thereby opening the switch 163 and de-energizing the magnet 73, until just after the cam 145 has caused the main gate 24 to close.

While the above construction is satisfactory in many instances, I prefer, however, to so provide that the operation of the photo-electric cell 81 in closing the dribble gate 26 automatically and simultaneously functions to energize the magnet 73, thereby locking the beam 62. Fig. 13 illustrates a modified construction by means of which this object may be obtained.

In the modification shown in Fig. 13, power for operation of the various electrical devices is supplied through leads 170 and 171. In a normal operating circuit the magnet 73 contains a self-locking solenoid switch having a switch arm pivoted at one end 173 and having an electromagnet 174 which exerts a pull upon the arm 172 tending to hold it against the contact 175 against the action of a spring 176. When the photo-electric cell 81 operates through the relay 161 and relay switch 162 to energize the solenoid 34, a relay switch 177 connected to the electromagnet 174 by means of a lead 178 preferably having a resistance 179 therein, momentarily closes, thus energizing the electromagnet 174 and drawing the arm 172 to the left-hand position, thereby completing a circuit through the electromagnet 73 and locking the beam 62. The subsequent opening of the relay switch 177 does not unlock the beam 62 by reason of the self-locking character of the electromagnet 174 and switch arm 172.

Upon the repetition of a weighing cycle, however, just after the cam 145 has caused the main gate 24 to close, a cam 181 mounted upon the shaft 139 engages the switch arm 172 and forces it to the right, breaking the contact between the switch arm 172 and the contact 175 and de-energizing the electromagnet 174 as well as the magnet 73, and thereby unlocking the beam 62. The cam 181 immediately thereafter passes the arm 172 which, due to the action of spring 176, remains in the righthand or open position until the interruption of light to the photo-electric cell 81 causes the electromagnet 174 to again draw the arm 172 to the lefthand position.

Fig. 14 illustrates the sequence of operations which is performed by the modified form of apparatus illustrated in Fig. 13, the sequence taking place in a clockwise direction as illustrated in Fig. 14.

The sequence of operations which takes place when the apparatus illustrated in Figs. 1, 2 and 9 is employed differs from that shown in Fig. 14 only in that the energization of the beam holding magnet takes place after the bucket closes and preferably before the main gate 24 opens.

It will be obvious to those skilled in the art that my invention is susceptible of considerable modification in detail without departing from the essential teaching and scope of my invention as defined in the claims hereinafter made, and furthermore, that the terms I have employed herein are employed as words of description and not as words of limitation. Consequently, my invention is not limited to the illustrated examples given hereinabove, but is to be broadly construed as to the scope of the claims hereinafter made.

I claim:

1. In an automatic weighing device, a supply chamber having a main gate adapted to deliver the bulk of a predetermined amount of material and a dribble gate adapted to deliver the remaining portion of said amount after said main gate closes, a weighing receptacle adapted to receive said material, said receptacle being mounted upon a beam mechanism adapted to tip when said vessel receives the predetermined amount of material, means to lock said beam mechanism against tipping movement during the delivery of the bulk of the material, means to release said locking means as said main gate closes, electromagnetic means for closing said dribble gate, a relay adapted to control said electro-magnetic means, a photo-electric cell adapted to operate said relay to close said dribble gate, a source of light for said cell, and means for intercepting light from said source to said cell that is responsive to the accumulation of the predetermined amount of material in said receptacle.

2. In an automatic weighing device, a supply chamber having a main gate adapted to deliver the bulk of a predetermined amount of material and a dribble gate adapted to deliver the remaining portion of said amount after said main gate closes, a weighing receptacle adapted to receive said material, said receptacle being mounted upon a beam mechanism adapted to tip when said vessel receives the predetermined amount of material, means to lock said beam mechanism against tipping movement during the delivery of the bulk of the material, means to release said locking means as said main gate closes, electromagnetic means for closing said dribble gate, a relay adapted to control said electro-magnetic means, a photo-electric cell adapted to operate said relay to close said dribble gate, a source of light for said cell, and means for intercepting light from said source to said cell mounted upon said beam mechanism and adapted to operate upon the accumulation of the predetermined amount of material in said receptacle.

3. In an automatic weighing device, a supply chamber having a main gate adapted to deliveer the bulk of a predetermined amount of material and a dribble gate adapted to deliver the remaining portion of said amount after said main gate closes, a weighing receptacle adapted to receive said material, said receptacle being mounted upon a beam mechanism adapted to tip when said vessel receives the predetermined amount of material, means to lock said beam mechanism against tipping movement during the delivery of the bulk of the material, means to release said locking means as said main gate closes, electromagnetic means for closing said dribble gate, a relay adapted to control said electro-magnetic means, a photo-electric cell adapted to operate said relay to close said dribble gate, a source of light for said cell, a shield between said source of light and said cell having a narrow horizontal slit therein, and a vane carried by said beam and adapted to intercept the passage of light through said slot when accumulation of said predetermined amount of material in said receptacle causes the beam to tip.

4. In an automatic weighing device, a supply chamber having a main gate adapted to deliver the bulk of a predetermined amount of material and a dribble gate adapted to deliver the remaining portion of said amount after said main gate closes, said main gate and said dribble gate being so disposed with respect to each other that opening of said main gate causes an opening of said dribble gate but closing of said main gate does not of itself cause said dribble gate to close, a weighing receptacle adapted to receive said material, said receptacle being mounted upon a beam mechanism adapted to tip when said receptacle receives the predetermined amount of material, means to lock said beam mechanism against tipping movement during the delivery of the bulk of the material, means to release said locking means as said main gate closes, a normally idle solenoid for closing said dribble gate, and means for energizing said solenoid to close said dribble gate that is responsive to tipping of said beam mechanism.

5. In an automatic weighing device, a supply chamber having a main gate adapted to deliver the bulk of a predetermined amount of material and a dribble gate adapted to deliver the remaining portion of said amount after said main gate closes, said main gate and said dribble gate being so disposed with respect to each other that opening of said main gate causes an opening of said dribble gate but closing of said main gate does not of itself cause said dribble gate to close, a weighing receptacle adapted to receive said material, said receptacle being mounted upon a beam mechanism adapted to tip when said receptacle receives the predetermined amount of material, means to lock said beam mechanism against tipping movement during the delivery of the bulk of the material, means to release said locking means as said main gate closes, a normally idle solenoid for closing said dribble gate, a relay for controlling said solenoid, and photo-electric means for operating said relay, the supply of light to said photo-electric means being responsive to the position of said beam device.

6. In an automatic weighing device, a supply chamber having a main gate adapted to deliver the bulk of a predetermined amount of material and a dribble gate adapted to deliver the remaining portion of said amount after said main gate closes, said main gate and said dribble gate being so disposed with respect to each other that opening of said main gate causes an opening of said dribble gate but closing of said main gate does not of itself cause said dribble gate to close, a weighing receptacle adapted to receive said material, said receptacle being mounted upon a beam mechanism adapted to tip when said receptacle receives the predetermined amount of material, means to lock said beam mechanism against tipping movement during the delivery of the bulk of the material, means to release said locking means as said main gate closes, a normally idle solenoid for closing said dribble gate, a relay for controlling said solenoid, and photo-electric means for operating said relay, and means for varying the supply of light to said photo-electric means in accordance with the tipping of said beam mechanism.

7. In an automatic weighing machine, the combination which comprises, a supply chamber having a main gate adapted to deliver the bulk of a predetermined amount of material and a dribble gate adapted to deliver the remaining portion of said amount after said main gate closes, a receptacle adapted to receive said material, said receptacle being supported upon a balancing beam mechanism adapted to remain in a fixed position while said main gate is open, and adapted to tip as soon as said receptacle receives the predetermined amount of material, means actuated a definite period of time after main gate is opened to release said beam so as to be capable of movement from its fixed position under the weight of delivered material, and means responsive to tipping of said beam for holding said beam mechanism in said fixed position.

8. In an automatic weighing machine, the combination which comprises, a supply chamber having a main gate adapted to delived the bulk of a predetermined amount of material and a dribble gate adapted to deliver the remaining portion of said amount after said main gate closes, a receptable adapted to receive said materials, said receptacle being supported upon a balancing beam mechanism adapted to remain in a fixed position while said main gate is open, and adapted to tip as soon as said receptacle receives the predetermined amount of material, means responsive to tipping of said beam for holding said beam mechanism in said fixed position, and automatic means for releasing said beam after said main gate closes.

9. In an automatic weighing machine, the combination which comprises, a supply chamber having a main gate adapted to deliver the bulk of a predetermined amount of material and a dribble gate adapted to deliver the remaining portion of said amount after said main gate closes, a receptacle adapted to receive said material, said receptacle being supported upon a balancing beam mechanism adapted to tip as soon as said receptacle receives the predetermined amount of material, detention means for locking said beam and means for actuating said detention means that is responsive to movement of said beam when not thus locked, and means for releasing said detention means.

10. In an automatic weighing machine, the combination which comprises, a supply chamber having a main gate adapted to deliver the bulk of a predetermined amount of material and a dribble gate adapted to deliver the remaining portion of said amount after said main gate closes, a receptacle adapted to receive said material, said receptacle being supported upon a balancing beam mechanism adapted to tip as soon as said receptacle receives the predetermined amount of material, electro-magnetic means for locking said beam in one position, and means for energizing said electro-magnetic means that is responsive to movement of said beam mechanism when unlocked.

11. In an automatic weighing machine, the combination which comprises, a supply chamber having a main gate adapted to deliver the bulk of a predetermined amount of material and a dribble gate adapted to deliver the remaining portion of said amount after said main gate closes, a receptacle adapted to receive said material, said receptacle being supported upon a balancing beam mechanism adapted to tip as soon as said receptacle receives the predetermined amount of material, electro-magnetic means for locking said beam in one position, a self-locking solenoid switch in the circuit of said electro-magnetic means, means for opening said switch to free said beam after said main gate closes, and means for closing said solenoid switch that is responsive to the tipping of said beam mechanism caused by the accumulation of the predetermined amount of material in said receptacle.

12. In an automatic weighing machine, the combination which comprises, a supply chamber having a main gate adapted to deliver the bulk of a predetermined amount of material and a dribble gate adapted to deliver the remaining portion of said amount after said main gate closes, a receptacle adapted to receive said material, said receptacle being supported upon a balancing beam mechanism adapted to tip as soon as said receptacle receives the predetermined amount of material, electro-magnetic means for locking said beam in one position, a self-locking solenoid switch in the circuit of said electro-magnetic means, means for opening said switch to free said beam after said main gate closes, and means for closing said solenoid switch and said dribble gate that is responsive to the tipping of said beam mechanism caused by the accumulation of the predetermined amount of material in said receptacle.

13. In an automatic weighing machine, the combination which comprises, a supply chamber having a main gate adapted to deliver the bulk of a predetermined amount of material and a dribble gate adapted to deliver the remaining portion of said amount after said main gate closes, a receptacle adapted to receive said material, said receptacle being supported upon a balancing beam mechanism adapted to tip as soon as said receptacle receives the predetermined amount of material, electro-magnetic means for locking said beam in one position, a self-locking solenoid switch located in the circuit of said electro-magnetic means, an automatic sequence control device adapted to mechanically engage and thereby open said switch immediately after said main gate closes, and means for re-closing said switch that is responsive to the tipping of said beam caused by accumulation of the predetermined amount of material in said receptacle.

14. In an automatic weighing device, a supply chamber having a main gate adapted to deliver the bulk of a predetermined amount of material and a dribble gate adapted to deliver the remaining portion of said amount after said main gate closes, a receptacle adapted to receive said material, said receptacle being mounted upon a beam mechanism adapted to tip when said vessel receives the predetermined amount of material, and an automatic sequence control device comprising multiple cam mechanism adapted to discharge said receptacle and to operate said gates in predetermined sequence, a driving member, and an automatic clutch device adapted when actuated to cause said cam mechanism to perform a single sequence of said operations.

15. In an automatic weighing device, a supply chamber having a main gate adapted to deliver the bulk of a predetermined amount of material and a dribble gate adapted to deliver the remaining portion of said amount after said main gate closes, a receptacle adapted to receive said material, said receptacle being mounted upon a beam mechanism adapted to tip when said vessel receives the predetermined amount of material, and an automatic sequence control device comprising multiple cam mechanism mounted upon a shaft and adapted to discharge said receptacle and operate said gates in a predetermined sequence, a driving member, and an automatic clutch device adapted when actuated to cause said driving member to rotate said shaft through a single sequence of said operations.

16. In an automatic weighing machine, the combination which comprises, a supply chamber having a main gate adapted to deliver the bulk of a predetermined amount of material and a dribble gate adapted to deliver the remaining portion of said amount after said main gate closes, a receptacle adapted to receive said material, said receptacle being supported upon a balancing beam mechanism adapted to tip as soon as said receptacle receives the predetermined amount of material, electro-magnetic means for locking said beam mechanism in one position, an automatic sequence control device comprising multiple cam mechanism mounted upon a shaft and adapted to discharge said receptacle, energize said electro-magnetic means to lock said beam mechanism, open said main gate and said dribble gate, close said main gate and de-energize said electro-magnetic means to free said beam mechanism substantially in the order named, a driving member, an automatic clutch device adapted when actuated to cause said driving member to rotate said shaft through a single sequence of said operations and means for closing said dribble gate that is responsive to tipping of said beam mechanism caused by accumulation of the predetermined amount of material in said receptacle.

17. In an automatic weighing device, a supply chamber having a main gate adapted to deliver the bulk of a predetermined amount of material and a dribble gate adapted to deliver the remaining portion of said amount after said main gate closes, a weighing receptacle adapted to receive said material, said receptacle being mounted upon a beam mechanism adapted to tip when said vessel receives the predetermined amount of material, photo-electric means adapted to effect the closing of said dribble gate in accordance with tipping of said beam mechanism caused by accumulation of the predetermined amount of material in said receptacle, and means actuated by emptying of said receptacle to cause repetition of the cycle of operations in weighing a subsequent charge of material.

18. In an automatic weighing device, a supply chamber having a main gate adapted to deliver the bulk of a predetermined amount of material and a dribble gate adapted to deliver the remaining portion of said amount after said main gate closes, a weighing receptacle adapted to receive said material, said receptacle being mounted upon a beam mechanism adapted to tip when said vessel receives the predetermined amount of material, electro-magnetic means for closing said dribble gate, a relay adapted to control said electro-magnetic means, a photo-electric cell adapted to operate said relay to close said dribble gate, a source of light for said cell, means for intercepting light from said source to said cell that is responsive to the accumulation of the predetermined amount of material in said receptacle, and means actuated by emptying of said receptacle to cause repetition of the cycle of operations in weighing a subsequent charge of material.

19. In an automatic weighing device, a supply chamber having a main gate adapted to deliver the bulk of a predetermined amount of material and a dribble gate adapted to deliver the remaining portion of said amount after said main gate closes, a weighing receptacle adapted to receive said material, said receptacle being mounted upon a beam mechanism adapted to tip when said vessel receives the predetermined amount of material, electro-magnetic means for closing said dribble gate, a relay adapted to control said electro-magnetic means, a photo-electric cell adapted to operate said relay to close said dribble gate, a source of light for said cell, means for intercepting light from said source to said cell mounted upon said beam mechanism and adapted to operate upon the accumulation of the predetermined amount of material in said receptacle, and means actuated by emptying of said receptacle to cause repetition of the cycle of operations in weighing a subsequent charge of material.

20. In an automatic weighing device, a supply chamber having a main gate adapted to deliver the bulk of a predetermined amount of material and a dribble gate adapted to deliver the remaining portion of said amount after said main gate closes, a weighing receptacle adapted to receive said material, said receptacle being mounted upon a beam mechanism adapted to tip when said vessel receives the predetermined amount of material, electro-magnetic means for closing said dribble gate, a relay adapted to control said electro-magnetic means, a photo-electric cell adapted to operate said relay to close said dribble gate, a source of light for said cell, a shield between said source of light and said cell having a narrow horizontal slit therein, a vane carried by said beam and adapted to intercept the passage of light through said slit when accumulation of said predetermined amount of material in said receptacle causes the beam to tip, and means actuated by emptying of said receptacle to cause repetition of the cycle of operations in weighing a subsequent charge of material.

21. In an automatic weighing machine, a supply chamber having a main gate adapted to close after delivery of the main portion of a predetermined amount of material and a dribble gate adapted to close after the predetermined amount of material has been delivered, a weighing receptacle positioned beneath said gates to receive the material, a weighing beam upon which said weighing receptacle is mounted, means to lock said weighing beam against movement during delivery of the main portion of the material, means to close said main gate and means to unlock said weighing beam substantially simultaneously therewith, and photo-electrically controlled means responsive to movement of said weighing beam to close said dribble gate and to relock said weighing beam against movement substantially simultaneously therewith, including a self-locking switch to maintain said locking means in operation.

22. In a machine adapted to segregate accurately weighed quantities of material, the combination of; a weighing beam having a fulcrum located in a fixed plane; and a weighing receptacle mounted upon said beam comprising, telescoping members, one of which is fixed in relation to said weighing beam and the other of which may be adjustably secured in variable position with respect to said weighing beam in order to vary the effective size of said weighing receptacle, bottom dumping gates on said receptacle adapted to cooperate with said extensible telescoping member, means carried by said receptacle to operate and control said dumping gates and being fixed with relation to said weighing beam, and means to allow extension of said telescoping members while operation and control of said gates is retained.

ROBERT N. CUNDALL.